Figure 1:
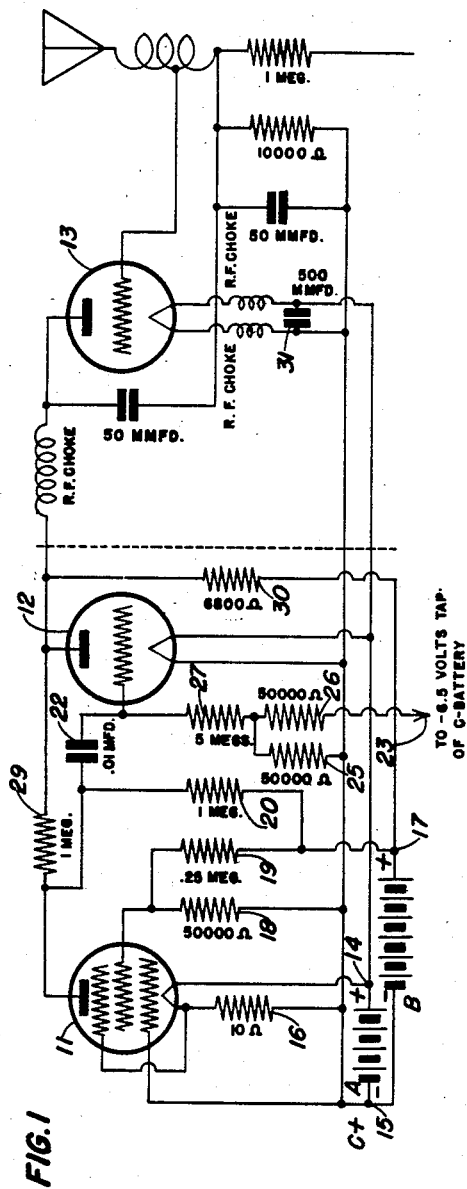

Feb. 9, 1960

J. H. KUCK 2,924,789

BATTERY TRANSIENT TESTING BY FREQUENCY MODULATION

Filed April 18, 1946

INVENTOR
JOHN H. KUCK

BY

ATTORNEY

United States Patent Office 2,924,789
Patented Feb. 9, 1960

2,924,789

BATTERY TRANSIENT TESTING BY FREQUENCY MODULATION

John H. Kuck, Washington, D.C., assignor to the United States of America as represented by the Secretary of the Navy Application April 18, 1946, Serial No. 662,985

2 Claims. (Cl. 332—16)

The present invention relates to electrical circuits for producing electrical oscillations having a characteristic indicative of variations in a supply voltage. It particularly relates to a radio sonde circuit arrangement of the type in which the frequency of a radio frequency signal is indicative of the behavior of a voltage source included therein.

When a radio sonde, including an oscillator and a multi-stage amplifier coupled thereto, is arranged in accordance with the present invention and has proportions represented by the values disclosed herein, it is found that the oscillations produced may be made to vary in pitch or frequency in accordance with the A-battery potential or cathode emission of one or more of the electronic tubes included in the circuit. More particularly, A-voltage fluctuations affect the first amplifier tube by changing the bias potential on its grid with respect to the average filament potential. Thus, the "signal" developed by said A-voltage fluctuations, and consequent bias changes, enters the amplifier as an input voltage applied directly from grid to filament and is amplified in the normal manner by said first amplifier tube.

Additionally, the oscillations may be made to vary in accordance with B-battery potential. It is thus practicable to measure the voltage of an A- or B-battery by measuring the pitch of the radio frequency signals, and this affords a way of ascertaining the condition and behavior of an inaccessible potential source such as a battery carried by a projectile in flight, or by a free balloon.

One object of the invention is, therefore, to provide an improved radio sonde circuit arrangement designed to be so carried, by a projectile or balloon, along with the battery to be tested, and having such characteristics that the greatest possible change of pitch relative to the variation of voltage to be studied is produced, for the purpose of attaining maximum accuracy in the observation of the behavior of the battery.

Since the entire arrangement is inaccessible after the projectile is fired or the balloon is released, as the case may be, it is necessary that the oscillations be transmitted to a receiving station at a remote observing point. A further object of the invention is to provide an improved arrangement for testing mobile batteries and for determining their degree of freedom from voltage fluctuations of a character which would tend to impair the action of electronic devices, such as a radio proximity fuze.

In order to investigate irregularities of this kind, the battery under test is caused to energize a circuit including an amplifier and an oscillator in such a way that the fluctuations modulate the frequency of the oscillator output. The output signal of the oscillator is received at the test station and from the received signal information concerning the characteristics of the battery is then deduced. By the use of the present improved circuits, the battery voltage fluctuations are employed to produce frequency modulation of the oscillator output.

Circuits especially suitable for investigating irregularities of the A- and B-voltages are chosen herein for illustrative purposes as embodiments of the invention.

Figure 2:
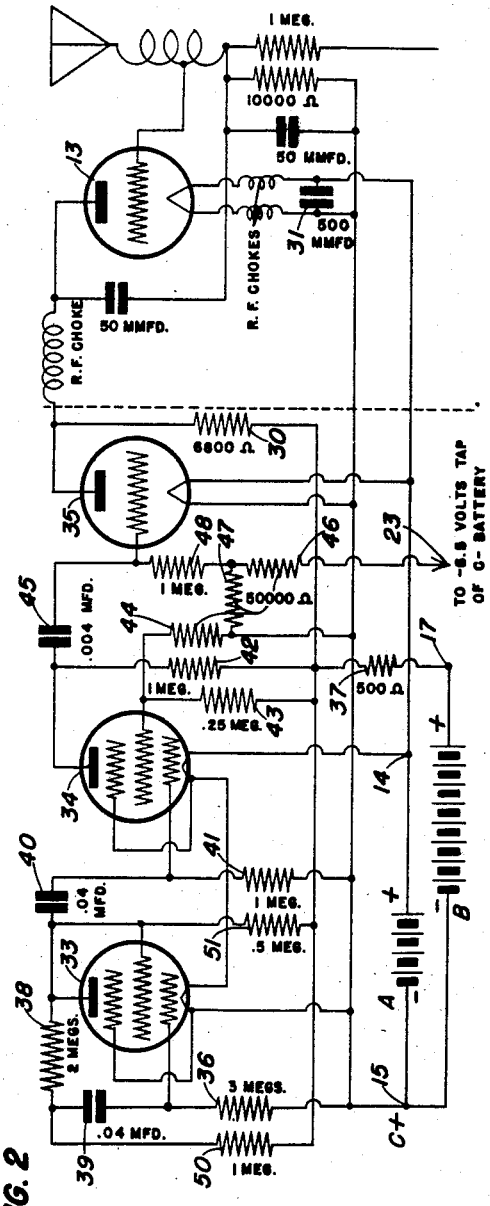

In the accompanying drawings:

Figure 1 is a diagram of a circuit in accordance with the present invention and suitable for investigating the behavior of the A-battery; and Figure 2 is a similar diagram relating to a circuit in accordance with the invention and suitable for investigating B-battery behavior.

Referring first to Fig. 1, there is shown a two-stage amplifier comprising a pentode 11 and a triode 12, the latter being coupled to an oscillator comprising a triode 13. All the tubes are of the filamentary cathode type.

The filaments of tubes 11 and 12 are connected in parallel to the terminals 14, 15 of an A-battery, except that a resistor 16 (10 ohms) is inserted in the negative battery lead of the filament of tube 11. The primary purpose of the resistor 16 is to drop the A-voltage to the proper level for operation of this particular tube. It does, however, also function to increase the input signal. An explanation of this action is as follows:

The signal which is effectively applied to the input tube 11 by a fluctuation in the A-voltage is the fluctuation in the average potential, i.e., the potential at midpoint, of the cathode with respect to the ground point 15 to which the grid is connected. If resistor 16 were not present, the input signal would thus be equal to approximately one-half of the A-voltage fluctuation. However, the presence of the resistor 16 between the filament and ground increases the potential of the filament with respect to point 15 and thus a larger fraction of the total A-voltage fluctuation is applied between the midpoint (i.e., average potential point) of the filament and the point 15.

The control grid of the tube 11 is connected directly to the negative terminal 15 of the A-battery and thus is subjected to a bias equal to the potential drop across resistor 16. The screen grid potential for tube 11 is applied thereto from the junction of resistors 18 and 19 (50,000 ohms and 250,000 ohms, respectively), these resistors being connected in series between the B+ terminal 17 and the B— terminal 15. The plate or anode of the tube 11 is coupled to the B+ terminal 17 through a resistor 20 (one megohm), which acts as a plate load resistor, and is also coupled to terminal 17 through a series combination of resistor 29 (one megohm) and resistor 30 (6800 ohms). The purpose of the connection between the anodes of the tubes 11 and 12 through the resistor 29 is to provide negative feed-back for the second amplifier stage, which includes the tube 12 and its grid coupling network, in order to minimize distortion of the signal.

It should be understood that no special significance can be attached to the accidental fact that a D.C. path can be traced through resistors 29 and 30 to B+.

The anode of the tube 11 is coupled to the grid of the tube 12 by a coupling capacitor 22 (0.01 mfd.). Terminal 23 is connected to the negative (—6.5 volts) terminal of a C-battery (not shown) and the biasing network for the control electrode of tube 12 is traced from terminal 23 and through a series combination of resistors 26 and 25 (each 50,000 ohms) to terminal 15, which also functions as the C+ terminal. The control electrode of tube 12 is connected to the junction of resistors 25 and 26 by a resistor 27 (5 megohms). A bias of about —3 volts is, therefore, impressed on the control electrode of tube 12 by the voltage drop in resistor 25. Resistor 30, connected between the anode of tube 12 and terminal 17, functions as the plate resistor for said tube 12.

The oscillator triode 13 has its filamentary cathode connected to the A-battery terminals, a radio frequency choke being provided in each lead and a by-pass capacitor 31 (500 mmd.) being connected across the leads for keeping the high frequency energy out of the amplifier circuit. Another radio frequency choke is interposed between the plates of tubes 12 and 13 for a like purpose.

The oscillator is more or less conventional and need not be described in minute detail herein. It should be stated with reference thereto, however, that the circuit constants and frequency are so chosen (experimentally) that modulation by variation of the plate voltage produced is predominantly frequency modulation rather than the amplitude modulation that would normally be expected from such a circuit. Although some amplitude modulation is also produced, its amplitude is very small even when the frequency modulation deviation is large enough to operate the receiver at full volume. The frequency modulation is attributed to operation of the oscillator plate voltage at a low value so that the electron transit time affects the oscillator frequency appreciably. Thus, the transit time variation and frequency modulation would be expected to arise from modulation of the plate voltage. In the operation of the embodiment of Fig. 1, tube noises produce a modulation signal in tube 11. This signal is amplified in tube 12 and is applied to the oscillator anode circuit. The A-battery fluctuations frequency-modulate the oscillator output signal. Frequency modulation is preferably used for transmission and reception of the radio sonde signals because of its well known advantages, such as the fact that the audio output of a receiver and thus the calibration of the present improved sonde may be made independent of received-signal intensity.

While the embodiment illustrated in Fig. 1 has been provided for the purpose of accentuating the effects of A-voltage fluctuations and suppressing the effects of B-voltage fluctuations, diametrically opposed considerations are involved in the embodiment of Fig. 2. That is, the A-battery disturbances are reduced to the extent most practicable while those occasioned by the B-battery are emphasized.

The embodiment of Fig. 2 of the invention comprises three thermionic tubes 33, 34 and 35, in addition to the oscillator tube 13. The tube 33 is a pentode but is operated as a triode by connecting its screen and anode together. The tube 34 is operated as a pentode and is preferably of the same type as tube 33. The filaments of tubes 33 and 34 are connected in series, that of tube 33 being near the negative side of the A-battery. This arrangement provides discrimination against noise originating in the A-battery due to a bucking effect, as follows: By reason of the equality of the division of A-voltage between the filaments of tubes 33 and 34, the A noise effect on the second tube is three times that on the first, more negative filament.

That is to say, the A signal which is effective as a voltage between the grid and filament of a tube is that fraction of the total A-fluctuation which is impressed between the midpoint (i.e., average potential point) of the cathode and the ground point 15 to which the grid is connected. Thus, if the A signal voltage divides equally between the two filaments, the voltage between the midpoint of filament and ground is one-fourth for tube 33 and three-fourths for tube 34, so that the A signal entering 34 is three times that entering 33.

Since the A signal output of tube 33 produces an effect on tube 34 which is out of phase with that which reaches 34 directly through its own filament, the two effects can be made to cancel each other, if the gain of the first stage is adjusted so the two signals entering 34 are equal in magnitude. Since the signal entering 34 directly is three times that applied to the input of 33, as previously described, it follows that the gain of the first stage to an A signal should be adjusted to a value of three for optimum bucking of the A signal. This gain is attained by proper choice of the value of the negative feed-back resistor 38 which forms a part of the feed-back circuit comprising said resistor (2 megohms) and a capacitor 39 (0.04 mfd.) between the anode and control electrode of tube 33.

A resistor 50 is connected in the grid circuit of the tube 33 and provides a path for the introduction of B signals into the first amplifier stage. This resistor 50 has no effect on the bucking out of A noise other than to affect the amount of negative feed-back produced by resistor 38. Thus, the value of resistor 38 chosen for optimum bucking will be different due to the presence of resistor 50 in the circuit.

The screen and anode of tube 33 are connected together and to the positive side of the B-battery through a resistor 51 (½ megohm) and a resistor 37 (500 ohms). As indicated above, negative feed-back is also provided for tube 33 by the resistor 38 connected between its anode and its control grid, the capacitor 39 isolating said grid from the B-voltage. This resistor 38 assists in neutralizing the signal produced by fluctuations of the A-battery by facilitating the adjustment of relative gains of tubes 33 and 34.

The output of tube 33 is applied to the control electrode of tube 34 through a coupling capacitor 40 (0.04 mfd.). The grid resistor 41 for the tube 34 has a value preferably of the order of one megohm and is connected to terminal 15. The high potential terminal 17 of the B-battery is connected to the anode of tube 34 through a series combination of resistors 37 and 42 (500 ohms and megohm, respectively). Screen potential for tube 34 is provided by a network which may be traced from terminal 17 through resistor 37 to the junction of resistors 37 and 42, then through the series combination of resistors 43 and 44 back to the minus B terminal 15 (the values of resistors 43 and 44 being one-fourth megohm and 50,000 ohms, respectively). The screen grid of tube 34 is connected to the junction of resistors 43 and 44 and is, therefore, by reason of the drop in resistor 44, at a positive potential with respect to terminal 15 and the cathode of tube 34. The output of tube 34 is applied to the control electrode of tube 35 through a coupling capacitor 45 (0.004 mfd.) and the proper grid bias for said tube 35 is provided by resistors 46 and 47 (each 50,000 ohms), these resistors being connected in series across a C-battery (not shown). The control electrode of tube 35 is connected to the junction of resistors 46 and 47 through resistor 48 (one megohm), thus giving that electrode a negative bias of approximately three volts. The anode of tube 35 is coupled to the anode of the oscillator 13 in the same fashion as in the Fig. 1 embodiment, and the oscillator circuit of Fig. 2 is identical with that Fig. 1.

In order to discriminate against undesirable signals, such as might be created by tube microphonics or pulses arising from non-linearity in the various stages of the amplifier, degeneration is introduced. This is effected by the presence of the reistor 37. More specifically, although there are only three stages of amplification, the resistor 50 may be considered as injecting a B signal onto the grid of tube 33 of the same phase as that which would come from the plate resistor of another amplifier stage if there were such a stage preceding said tube 33. Thus, the action is similar to that taking place in a 4-stage amplifier rather than that in a 3-stage amplifier.

What is claimed is:

1. A circuit for investigating fluctuations of the voltage of a battery comprising an electronic tube having a cathode heated by said battery, said tube having a control electrode coupled to the negative terminal of said battery, means for accentuating the effect of said fluctuations including a resistor in the negative lead between said battery and said cathode whereby the average potential of said cathode is made more positive with respect to said control electrode, and an oscillator for transmitting high frequency signals, said oscillator having a modulation input circuit coupled to the output of said tube, whereby said signals are frequency-modulated in accordance with fluctuations of the voltage of said battery.

2. A circuit as defined in claim 1 and including means for discriminating against the effect of fluctuations in the anode voltage of said tube.

References Cited in the file of this patent

UNITED STATES PATENTS

| | | |
|---|---|---|
| 2,165,509 | Ring et al. | July 11, 1939 |
| 2,253,975 | Guanella | Aug. 26, 1941 |
| 2,350,171 | Lawrence | May 30, 1944 |
| 2,351,368 | Roberts | June 13, 1944 |
| 2,420,199 | Sanders | May 6, 1947 |